United States Patent
Prasad

(10) Patent No.: US 7,773,979 B1
(45) Date of Patent: Aug. 10, 2010

(54) SYSTEM AND METHOD FOR INTEGRATION OF NON-JAVA DEVICE INTO A JAVA-BASED MOBILE SERVICE ORIENTED ARCHITECTURE

(75) Inventor: Ashim Prasad, Overland Park, KS (US)

(73) Assignee: Sprint Communication Company L.P., Overland Park, KS (US)

( * ) Notice: Subject to any disclaimer, the term of this patent is extended or adjusted under 35 U.S.C. 154(b) by 733 days.

(21) Appl. No.: 11/559,582

(22) Filed: Nov. 14, 2006

(51) Int. Cl.
*H04M 3/10* (2006.01)

(52) U.S. Cl. ........................................ 455/418; 455/426

(58) Field of Classification Search ................. 455/445, 455/418, 419; 370/352, 338, 401; 719/328; 709/203, 202, 219, 200; 707/1, 103, 10; 713/167
See application file for complete search history.

(56) References Cited

U.S. PATENT DOCUMENTS

| | | | |
|---|---|---|---|
| 2002/0069263 A1* | 6/2002 | Sears et al. ................. | 709/218 |
| 2003/0181196 A1* | 9/2003 | Davidov et al. .......... | 455/414.1 |
| 2004/0073944 A1* | 4/2004 | Booth ........................ | 725/131 |
| 2004/0111709 A1* | 6/2004 | Furst et al. .................. | 717/131 |
| 2004/0148586 A1* | 7/2004 | Gilboa ....................... | 717/108 |
| 2005/0050151 A1* | 3/2005 | Mitchell et al. ............. | 709/207 |
| 2005/0197157 A1* | 9/2005 | Li et al. .................... | 455/556.2 |
| 2007/0143447 A1* | 6/2007 | Beckum et al. ............. | 709/219 |
| 2007/0259663 A1* | 11/2007 | Weintraub et al. .......... | 455/433 |
| 2008/0090598 A1* | 4/2008 | Fanelli et al. ............... | 455/466 |
| 2008/0195726 A1* | 8/2008 | Melby et al. ................ | 709/221 |

* cited by examiner

*Primary Examiner*—Vincent P Harper
*Assistant Examiner*—Mahendra Patel

(57) ABSTRACT

Disclosed herein are a number of embodiments that enable BREW handsets and other devices to leverage a MSOA developed for J2ME handsets. The MSOA may be used to develop and deploy applications and services to handsets or other devices. In order to gain use of the MSOA, an actor may be developed for enabling communication with one or more servlets or one or more applications in the MSOA. Similarly, other devices, such as a set top box, may also gain the use of the MSOA through an adaptor that is capable of communication with one or more servlets or one or more applications in the MSOA. BREW handsets may also gain use of the MSOA through an actor developed in conjunction with an application as part of a servlet, midlet, actor triplet.

20 Claims, 6 Drawing Sheets

US 7,773,979 B1

SYSTEM AND METHOD FOR INTEGRATION OF NON-JAVA DEVICE INTO A JAVA-BASED MOBILE SERVICE ORIENTED ARCHITECTURE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Enterprises utilize a service-oriented architecture (SOA) to enable development and deployment of applications and services. A SOA is implemented by making resources available as independent services in a shared environment. The services may be accessed through an interoperability standard, such as a web services description language (WSDL), without any knowledge of the underlying programming language used to develop the service, or of the processes executed by the service. Applications may be easily developed in a SOA by defining how various distributed services are to inter-operate without needing to re-develop the underlying technology of each service used in the application.

Qualcomm has developed a Binary Runtime Environment for Wireless (BREW) client that provides abstraction for the development of applications on handsets, such as cell phones, without needing knowledge of the specific hardware or communication protocols used by the handsets. More recently, Qualcomm has developed BREW uiOne for providing additional abstraction between the development of graphical user interfaces (GUIs) and the underlying functionality being accessed through the GUI. BREW uiOne enables the customization and selection of themes to be used in GUIs on the handset. BREW uiOne also enables GUI content and themes to be updated through pushes from a uiOne delivery system.

SUMMARY

Disclosed herein is a mobile service oriented architecture that enables development and deployment of applications and services. The mobile service oriented architecture comprises a plurality of services, each with an interoperability interface to promote communication. The interoperability interfaces identify functions provided by each service and define communication aspects of each service. An enterprise service bus in the mobile service oriented architecture is configured to manage messaging for communicating with the services. A plurality of applications in the mobile service oriented architecture are in communication with the enterprise service bus. Each of the applications uses one or more of the services. Each of a plurality of servlets in the mobile service oriented architecture are in communication with one of the plurality of applications. Each servlet is configured to establish one or more instances of the one of the plurality of applications based on parameters. The mobile service oriented architecture also includes a handset with an actor configured to establish a connection with the plurality of servlets.

Also disclosed herein is a method of communicating with a Java-based mobile service oriented architecture using an actor on a Binary Runtime Environment for Wireless (BREW) handset. The method includes receiving a first request to execute a first application in the mobile service oriented architecture. A connection is established with a first servlet to initiate an instance of the first application via the first servlet. The method also includes receiving a second request to execute a second application in the mobile service oriented architecture. A connection is established with a second servlet to initiate an instance of the second application via the second servlet.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although an illustrative implementation of one embodiment of the present disclosure is disclosed below, the present system may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

Disclosed herein are a number of embodiments that enable Binary Runtime Environment for Wireless (BREW) handsets and other devices to leverage a mobile service oriented architecture (MSOA) developed for Java 2 Micro Edition (J2ME) handsets. The MSOA may be used to develop and deploy applications and services to handsets or other devices. In order to gain use of the MSOA, an actor may be developed for BREW handsets that enables communication with one or more servlets or one or more applications in the MSOA. Similarly, other devices, such as a set top box, may also gain the use of the MSOA through an adaptor that is capable of communication with one or more servlets or one or more applications in the MSOA. BREW handsets may also gain use of the MSOA through an actor developed in conjunction with an application as part of a servlet, midlet, actor triplet. By enabling BREW handsets to leverage a MSOA designed for J2ME handsets, the BREW handsets may take advantage of SOA infrastructure developed specifically for BREW handsets as well as SOA infrastructure developed for J2ME handsets.

Figure 1:
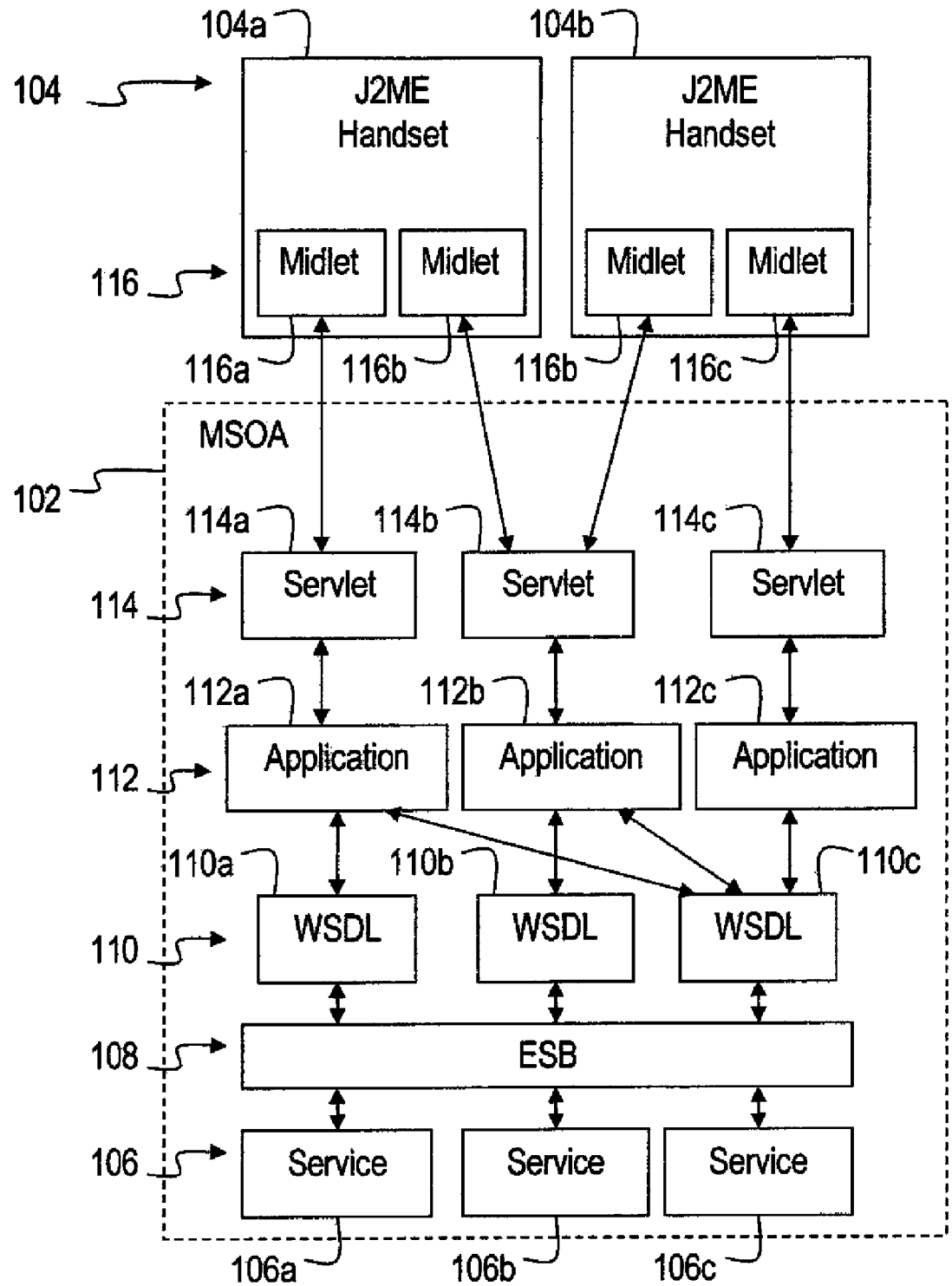
FIG. 1 shows one embodiment of a mobile service oriented architecture.

FIG. 1 shows one embodiment of a MSOA 102 for enabling development and deployment of applications and services to J2ME handsets 104. As shown in the embodiment of FIG. 1, the MSOA 102 includes services 106, an enterprise service bus (ESB) 108, Web Services Description Language (WSDLs) 110, applications 112, and servlets 114. While resident on the J2ME handsets 104 and separate from the MSOA 102, midlets 116 are also associated with the MSOA 102 as described below. While the embodiment illustrated in FIG. 1 shows two J2ME handsets 104, it is contemplated that there may be more or less J2ME handsets 104. A detailed description of each of the components in the MSOA 102 and how they interact follows.

A plurality of services 106 may be developed with each service being developed using one of a plurality of programming languages, such as C, C++, and Java. Services 106 may be internal services, external services, or third party services that may shared over the ESB 108 as described in detail below. While the services 106 may implement many processes, they are generally not considered an application in and of themselves. Rather, within the MSOA 102 environment, each service 106 is considered a tool that may be used in an application 112. For example, service 106a may be a location service for determining a geographic location (longitude and latitude) through global positioning system (GPS), triangulation, or any other geographic location determination. The location service 106a may return a geographic location in response to a given input, but may not necessarily be considered a comprehensive application.

The ESB 108 is a software infrastructure that provides event-based messaging for communicating between a service 106 and other services 106 or between a service 106 and one or more applications 112. The ESB 108 enables services 106 to be used by other services 106 or by applications 112 through an interoperability interface such as a WSDL 110 as described in more detail below. A service 106 may be dynamically added or reconfigured on the ESB 108 without needing to recompile or reconfigure any applications 112 or services 106 that use a reconfigured service 106. Similarly, a new application 112 may be created and added to the ESB 108 or an application 112 may be reconfigured using any new or existing services without needing to reconfigure or recompile the services 106 used by the application 112.

The WSDLs 110 provide mediation to enable communication between services 106 and applications 112 via messaging on the ESB 108. The WSDLs 110 enable communication with a service 106 without necessarily having any knowledge of the underlying programming language used to develop the service 106, or of the particular processes executed by the service 106. Specifically, the WSDLs 110 abstractly describe the functions provided by a service 106 and the message formats for communicating with the service 106. As shown in FIG. 1, there is one WSDL 110 for each of the services 106 so as to provide a public interface on the ESB 108 for communicating with each service 106. As shown, WSDL 110a corresponds with service 106a, WSDL 110b corresponds with service 106b, and WSDL 110c corresponds with service 106c.

Through the mediation provided by a WSDL 110, an application 112 may request a service 106 on the ESB 108 and pass any parameters needed to implement the requested service 106. The service 106 may use one or more passed parameters to implement the requested service 106 and reply to the application 112 with a result of the service 106. While the embodiment illustrated in FIG. 1 uses WSDLs 110, other interoperability standards that may be generally referred to as interoperability interfaces may be used to enable communication between a service 106 and an application 112 or another service 106. Some such interoperability interfaces may include distributed content object model (DCOM), remote procedure call (RPC), or object request broker (ORB).

Each of the applications 112 may be developed using one or more services 106. In one embodiment the applications 112 may be developed with NetBeans. Using NetBeans, an application 112 may be developed by defining the use and interactions of one or more services. For example, application 112a may be developed to show a map indicating a location of a J2ME handset 104a. In this example, the application 112a may use services 106a and 106c. As mentioned above, service 106a may determine a geographic location of the J2ME handset 104a. Service 106c may generate a map based on a geographic location and specify the location in the map. As such, application 112a may use service 106a to determine the geographic location of the J2ME handset 104a. Application 112a may then pass the geographic location results to the mapping service of service 106c, for example. Application 112a may then take the results from service 106c and deliver it to the J2ME handset 104a to be displayed in accordance with a midlet 116a as described in more detail below.

While each application 112 is illustrated as communicating directly with one or more WSDLs 110, this is for illustrative purposes only. As described above, each application 112 is operable to communicate with a WSDL 110 via the ESB 108. It is contemplated that in some embodiments the applications 112 may communicate directly with one or more WSDLs 110.

The logical flow of the applications 112 and how they use one or more of the services 106 may be dynamically changed without needing to change or update the services 106 used. Continuing the above example, if a new service 106b is developed that generates a street address based on a geographic location, then application 112a may be modified to also display a street address along with the location on the map. The modification of application 112a to incorporate the new service 106b does not affect the other services 106a and 106c used by application 112a.

The applications 112 may be distributed for use on J2ME handsets 104 through Java servlet 114 and midlet 116 pairs. When the applications 112 are developed using NetBeans, the servlet 114 and midlet 116 pairs may be automatically generated. While the midlets 116 may be automatically generated, there may be further customization for use on particular J2ME handsets 104.

As shown in the embodiment of FIG. 1, each application 112 has one servlet 114 to establish a one-to-one relationship between an application 112 and a servlet 114. Each J2ME handset 104 stores a midlet 116 for each application 112 that it uses. For example, a J2ME handset 104a may be distributed with midlet 116a and midlet 116b such that the J2ME handset 104a may use application 112a and application 112b via servlet 112a and servlet 112b respectively. Similarly, a J2ME handset 104b may be distributed with midlet 116b and midlet 116c such that the J2ME handset 104b may use application 112b and application 112c via servlet 112b and servlet 112c, respectively. It is contemplated that in some embodiments there may alternatively or additionally be a one-to-many, a many-to-one, or a many-to-many relationship between applications 112 and servlets 114.

Since a plurality of J2ME handsets 104 may be distributed with the ability to use one or more of the same applications 112, there may exist a many-to-one relationship between midlets 116 and a corresponding servlet 114. The many-to-one relationship is due to each of the midlets 116 being enabled to communicate with one servlet 114 and each of the servlets 114 each enabled to communicate with a plurality of corresponding midlets 116. As shown in the embodiment of FIG. 1, J2ME handset 104a and J2ME handset 104b are both distributed with the midlet 116b so as to enable both to be able to use application 112b. Each servlet 114 provides scalability by enabling an instance of an application 112 to be executed for each J2ME handset 104 that stores a corresponding midlet 116. As shown in the embodiment of FIG. 1, the servlet 114b enables the J2ME handset 104a and the J2ME handset 104b to each execute an instance of application 112b. Each of the midlets 116 describes how an application 112 will be displayed and utilized on a J2ME handset 104 and how the J2ME handset 104 will communicate with corresponding servlets 114. It is contemplated that in some embodiments there may alternatively or additionally be a one-to-one, a one-to-many, or a many-to-many relationship between midlets 116 and servlets 114.

The MSOA 102 described above enables development and deployment of applications 112 for use on J2ME handsets 104. The MSOA 102 is a J2ME handset 104 centric solution that relies on Java servlet 114 and midlet 116 pairs. However, many mobile and other devices that may use a SOA are not J2ME devices. Binary Runtime Environment for Wireless (BREW) handsets in particular are an example of one alternative to J2ME handsets. According to one embodiment, a system is provided for BREW handsets to integrate with a MSOA, such as the MSOA 102 described above, in order to leverage the development and deployment of applications and services for use on the BREW handsets.

Figure 2:
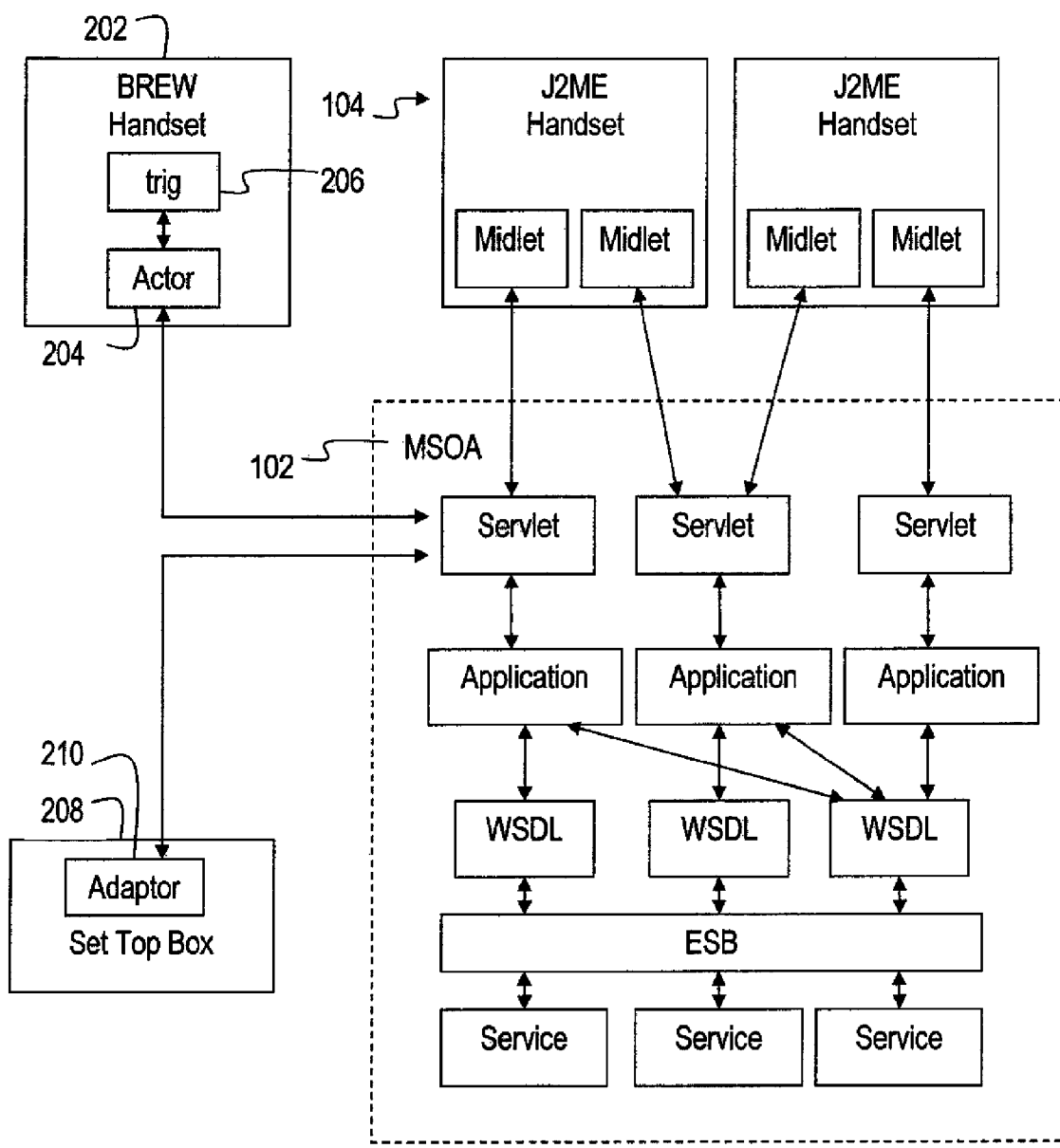
FIG. 2 shows another embodiment of a mobile service oriented architecture.

FIG. 2 shows one embodiment for enabling BREW handsets and other devices to leverage the MSOA 102 described in detail above. As shown in FIG. 2, a BREW handset 202 and a set top box 208 are illustrated as communicating with the MSOA 102 through one or more of the servlets 114 as described in detail below. The BREW handset 202 utilizes user interface applications and actors 204 to define a graphical user interface (GUI) and the underlying functionality being accessed through the GUI. A developer may generate a user interface application for each application that is to be implemented by an actor 204 on the BREW handset 202. The user interface application defines a GUI that is to be output to a display (not shown) on the BREW handset 202. The user interface application may also define how a GUI screen or GUI object may be manipulated in order to execute a desired operation or application 112. In the BREW handset environment, the user interface applications may be implemented as TrigML applications (trigs) 206. As used herein, a user interface application on the BREW handset 202 is referred to as a trig 206.

The actors 204 implement an application 112 or operation in response to the trig 206 generating an event and using one or more parameters passed by the trig 206. For example, a trig 206 may define an icon that may be selected through the GUI displayed on the BREW handset 202. Upon the icon being selected, the trig 206 may generate an event for the actor 204 to implement and the trig 206 may pass a parameter to the actor 204 identifying a URL associated with the selected icon. The event may be a browsing event, in which case the actor 204 may implement the functionality of browsing to the web page identified in the URL parameter. While the embodiment illustrated in FIG. 2 only shows one BREW handset 202 and one set top box 208, it is contemplated that there may be a plurality of BREW handsets 202 and/or set top boxes 208, or other similar devices which are well known.

The trig 206 or other trigs which might be present may also define how the applications 112 or any results produced by the applications 112 are to be displayed on a GUI screen. For example, the trig 206 may define an icon identifying an application 112 that is available through the MSOA 102. Upon manipulating a GUI screen or GUI object to execute the application 112, the trig 206 may generate an event for the actor 204 to implement and pass any necessary parameters to an actor 204. The event may be a request to execute an application 112 identified by one of the parameters passed by the trig 206.

In order to integrate the BREW handset 202 into the MSOA 102, an actor 204 may be used to communicate with one or more Java servlets 114. In some embodiments, the actor 204 may be used to communicate with any or all of the servlets 114. The actor 204 may use a parameter passed by the trig 206 to establish communication with the servlet 114 corresponding to the application 112 that is to be executed. Upon establishing communication with the servlet 114, the actor 204 may relay any parameters heeded by the application 112. The application 112 may be executed in accordance with the parameters supplied by the actor 204 and return any results to the actor 204. The actor 204 may then relay the results to the trig 206 to be displayed, stored, or otherwise used.

An example of the interaction between the trig 206, the actor 204, the servlet 114, and a corresponding application 112 according to one embodiment is described as follows. The trig 206 may define an icon corresponding to application 112a. Upon the icon being selected, the trig 206 may pass any parameters needed by application 112a and an identification of servlet 114a to the actor 204. The identification of servlet 114a may be a URL or any other unique identifier. If application 112a is configured to implement the generation of a map showing the location of a handset, then some of the parameters needed by application 112a may include the signal strength or a reading of timing signals from the three closest cell towers, for example. The readings may then be used by application 112a to perform triangulation calculations to determine a geographic location. In this case, the trig 206 may generate an event for another actor to take a reading of the signal strength or a reading of timing signals from the three closest cell towers along with a parameter indicating that the results of the reading are to be passed to the actor 204. Further, one of the parameters passed to the actor 204 may indicate that additional parameters are going to be provided by one or more additional actors on the BREW handset 202. The actor 204 may wait for the additional parameters from the other actors before establishing a connection with servlet 114a.

Alternatively, the trig 206 may generate one or more events for additional actors so as to collect all the parameters needed by application 112a prior to communicating with the actor 204. In this alternative, the trig 206 would pass all of the needed parameters to the actor 204 such that the actor 204 may establish a connection with servlet 114a without needing to wait for any additional parameters. In another alternative, the trig 206 may simply pass parameters to the actor 204 indicating which parameters are needed by application 112a. In this alternative, the actor 204 may communicate with any additional actors for gathering all of the parameters needed by application 112a prior to establishing a connection with servlet 114a. In a further alternative, the trig 206 may simply pass a parameter indicating that the actor 204 is to establish a connection with servlet 114a. Upon establishing a connection with servlet 114a, the actor 204 may receive a request for one or more parameters. The actor 204 may communicate with any additional actors for gathering all of the requested parameters and supply the parameters to application 112a via servlet 114a.

Upon the actor 204 receiving all of the parameters needed for application 112a, the actor 204 may establish a connection with servlet 114a using a URL or other unique identifier. The actor 204 may relay the parameters needed by application 112a to servlet 114a, which may then establish an instance of application 112a in accordance with the parameters provided. Servlet 114a may return the results of the instance of application 112a to the actor 204. In the example of application 112a generating a map showing the location of a handset, a bitmap image may be returned to the actor 204. The actor 204 may relay the results to the trig 206 or another trig to be displayed on the BREW handset 202.

The embodiment described above provides a unique shift from typical BREW handset implementations and typical Java-based MSOA solutions. This shift is particularly shown to occur at the interface between a handset and a Java servlet 114. In accordance with the description of FIG. 1 above, when looking at a single J2ME handset 104 there is a one-to-one relationship between midlets 116 and applications 112 executed on the J2ME handset 104 and a one-to-one relationship between midlets 116 and servlets 114. Typical BREW handsets may implement a plurality of applications with a trig and an actor pair defining the display and implementation of each application. When looking at a typical BREW handset there is a one-to-one relationship between trigs and actors and a one-to-one relationship between actors and applications implemented on the typical BREW handset. In accordance with the embodiment described above, a single actor 204 may communicate with a plurality of trigs 206. Further, the single actor may communicate with a plurality of servlets 114. When looking at the BREW handset 202 described above, there is a many-to-one relationship between trigs 206 and the actor 204 and a one-to-many relationship between the actor 204 and servlets 114. The actor 204 in the BREW handset 202 improves on typical BREW handsets by enabling communication with a MSOA 102 through the Java servlets 114. The actor 204 also improves on the MSOA 102 by only requiring one actor 204 to enable the communication between the BREW handset 202 and the plurality of Java servlets 114, rather than having a separate actor for each servlet 114.

Similar to the BREW handset 202, other devices may leverage the MSOA 102 through the servlets 114. As shown in FIG. 2, a set top box 208 may include an adaptor 210 for enabling communication with one or more of the Java servlets 114. Similar to the actor 204, the adaptor 210 may establish a connection with a servlet 114 and relay any parameters needed to establish an instance of one of the applications 112. The adaptor 210 may also relay the results of the application 112 to be displayed or otherwise used by the set top box 208. For example, the set top box 208 may display the results on a television or other display attached to the set top box 208.

Figure 3:
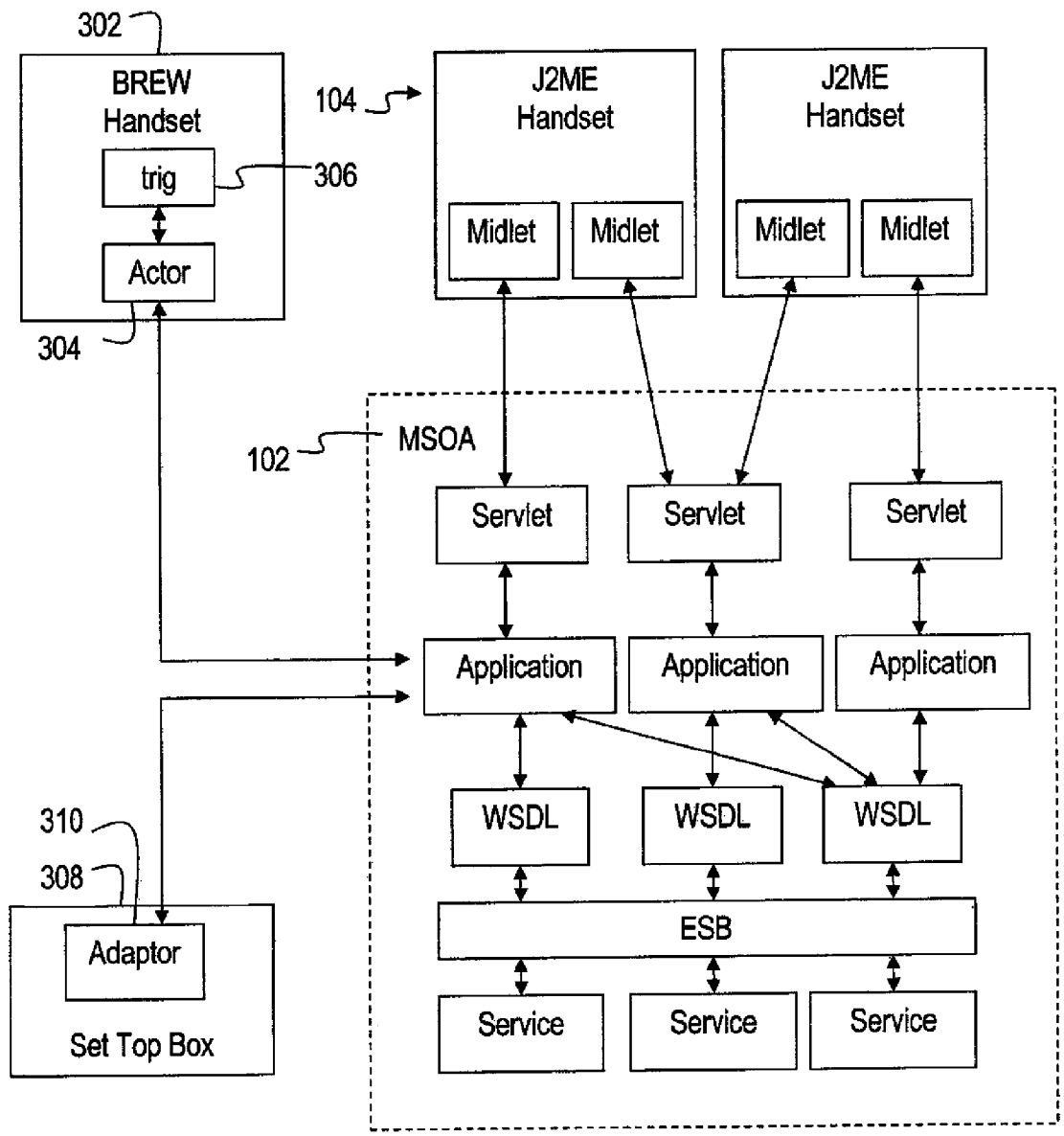
FIG. 3 shows another embodiment of a mobile service oriented architecture.

FIG. 3 shows another embodiment for enabling BREW handsets and other devices to leverage the MSOA 102. As shown in FIG. 3, a BREW handset 302 and a set top box 308 are illustrated as communicating with the MSOA 102 through the applications 112. The BREW handset 302 may communicate with the MSOA 102 through an actor 304 that may be used to communicate with one or more applications 112. The interaction between the trig 306 and the actor 304 is similar to the interaction described in detail above between the trig 206 and the actor 204. The actor 304 may use one or more parameters passed by the trig 306 to establish a connection with the application 112 that is to be executed. Upon establishing a connection with the application 112, the actor 304 may relay any parameters needed by the application 112 and establish an instance of the application 112 in accordance with the parameters provided. The application 112 may return any results to the actor 304 which may then relay the results to the trig 306 to be displayed or otherwise used.

Similar to the BREW handset 302, other devices may leverage the MSOA 102 through communicating with the applications 112. As shown in FIG. 3, a set top box 308 may include an adaptor 310 for enabling communication with one or more of the applications 112. Similar to the actor 304, the adaptor 310 may establish a connection with the application 112 and relay any parameters needed to establish an instance of the application 112. The adaptor 310 may also relay the results of the application 112 to be displayed or otherwise used by the set top box 308. While the embodiment illustrated in FIG. 3 only shows one BREW handset 302 and one set top box 308, it is contemplated that there may be a plurality of BREW handsets 302 or set top boxes 308.

Figure 4:
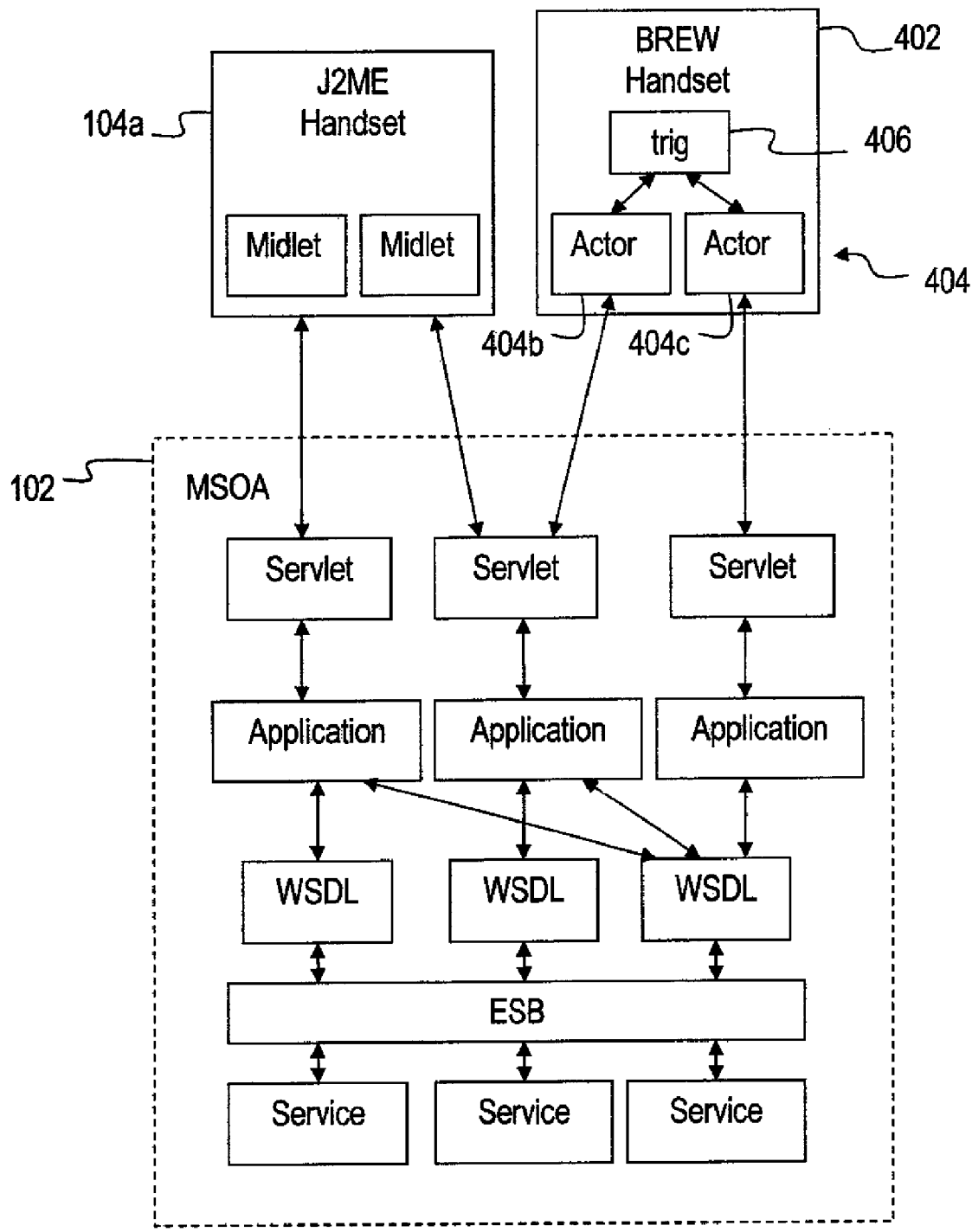
FIG. 4 shows another embodiment of a mobile service oriented architecture.

FIG. 4 shows another embodiment for enabling BREW handsets and other devices to leverage the MSOA 102. As shown in FIG. 4, rather than developing a generic actor to break into or communicate with the MSOA 102, the applications 112 may be developed such that a servlet 112, midlet 114, and actor 404 triplet are generated. For example, a developer may use NetBeans to not only generate a servlet 112 and midlet 114 pair. In one embodiment, modifications may be made to the NetBeans development environment to also generate an actor 404 for each application 112 developed. While the embodiment illustrated in FIG. 4 only shows the BREW handset 402 and the J2ME handset 104a, it is contemplated that there may be a plurality of BREW handsets 402 or J2ME handsets 104.

Similar to the MSOA 102 described in FIG. 1, each BREW handset 402 stores an actor 404 for each application 112 that it uses. For example, the BREW handset 402 may be distributed with actor 404b and actor 404c such that it can use application 112b and application 112c via servlet 114b and servlet 114c respectively. A plurality of BREW handsets 402 may be distributed with the ability to use one or more of the same applications 112. There may exist a many-to-one relationship between actors 404 and a corresponding servlet 114. The many-to-one relationship is due to each of the actors 404 being enabled to communicate with one servlet 114 and each of the servlets 114 enabled to communicate with a plurality of corresponding actors 404. Further, as shown in the embodiment of FIG. 4, J2ME handset 104a and a BREW handset 402 may be distributed with a midlet 116b and an actor 404b so as to enable both use the application 112b. It is contemplated that in some embodiments there may alternatively or additionally be a one-to-one, a one-to-many, or a many-to-many relationship between actors 404 and servlets 114.

The interaction between the trig 406 and the actors 404 may be similar to the normal trig-actor interaction on existing BREW handsets. For example, if a user desires to execute an instance of application 112b, then the user may select an icon defined in the trig 406 corresponding to actor 404b. The trig 406 may generate an event causing actor 404b to execute an instance of application 112b. Actor 404b may implement any functionality required to gather parameters needed by application 112b and to establish a connection with servlet 114b. Actor 404b may pass any parameters to servlet 114b to establish an instance of application 112b. Application 112b may return any results to the actor 404b, which may then relay the results to the trig 406 to be displayed or otherwise used.

Described above are a number of embodiments that enable BREW handsets and other devices to leverage a MSOA developed for J2ME handsets. The MSOA enables development and deployment of applications and services to handsets or other devices. In order to gain use of the MSOA, an actor may be developed for enabling communication with one or more servlets or one or more applications in the MSOA. Similarly, other devices, such as a set top box, may also gain the use of the MSOA through an adaptor that is capable of communication with one or more servlets or one or more applications in the MSOA, BREW handsets may also gain use of the MSOA through an actor developed in conjunction with an application as part of a servlet, midlet, actor triplet.

Figure 5:
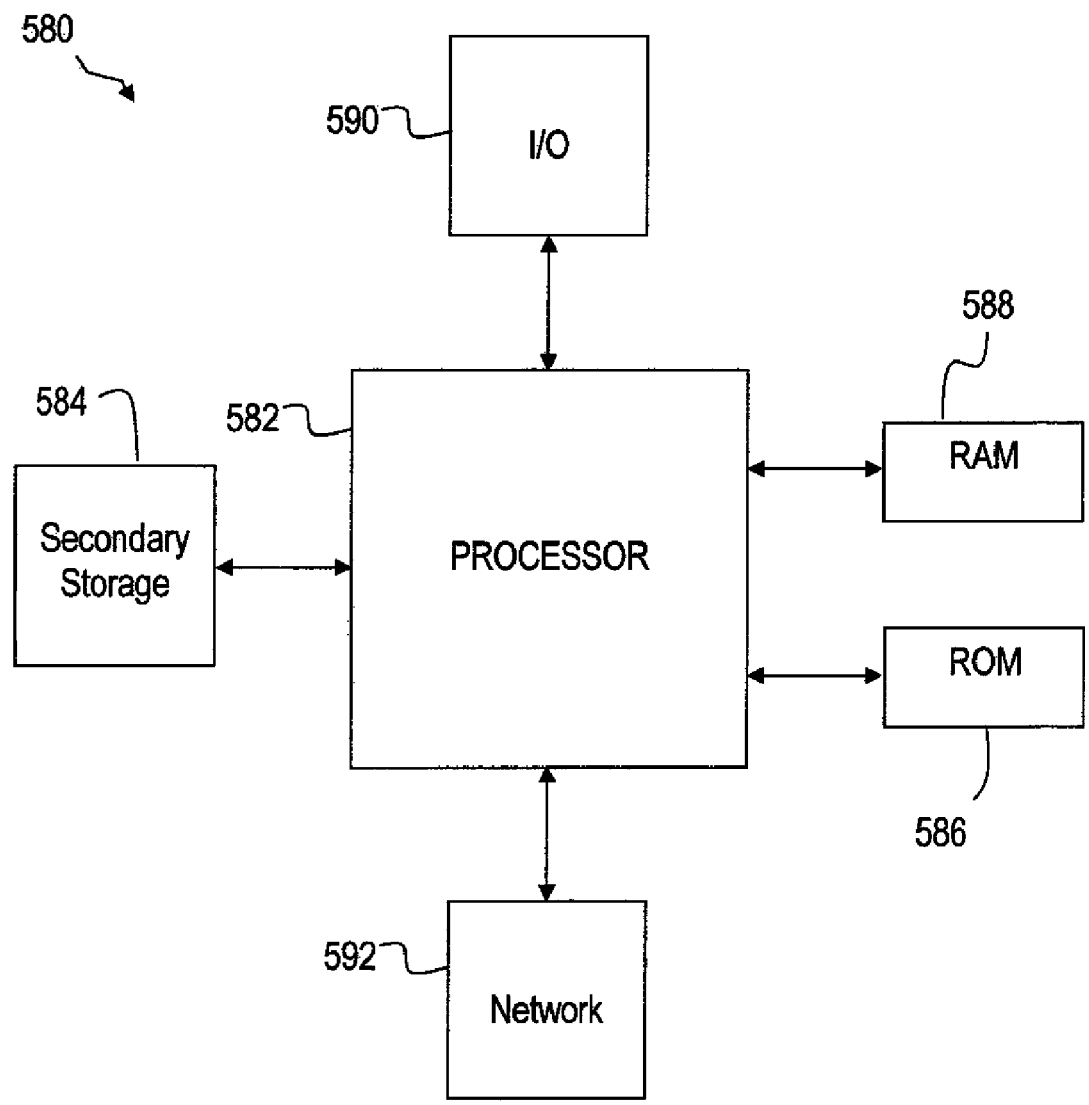
FIG. 5 illustrates an exemplary general purpose computer system suitable for implementing the several components of the disclosure.

The MSOA 102 or any part of the MSOA 102 described above may be implemented on any general-purpose computer with sufficient processing power, memory resources, and network throughput capability to handle the necessary workload placed upon it. FIG. 5 illustrates a typical, general-purpose computer system suitable for implementing one or more embodiments disclosed herein. The computer system 580 includes a processor 582 (which may be referred to as a central processor unit or CPU) that is in communication with memory devices including secondary storage 584, read only memory (ROM) 586, random access memory (RAM) 588, input/output (I/O) 590 devices, and network connectivity devices 592. The processor may be implemented as one or more CPU chips.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage. The RAM 588 is used to store volatile data and perhaps to store instructions. Access to both ROM 586 and RAM 588 is typically faster than to secondary storage 584.

I/O 590 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 592 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 592 devices may enable the processor 582 to communicate with an Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave Such information, which may include data or instructions to be executed using processor 582 for example, may be received from and outputted to the network, for example, in the form of a computer data baseband signal or signal embodied in a carrier wave. The baseband signal or signal embodied in the carrier wave generated by the network connectivity 592 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592.

Figure 6:
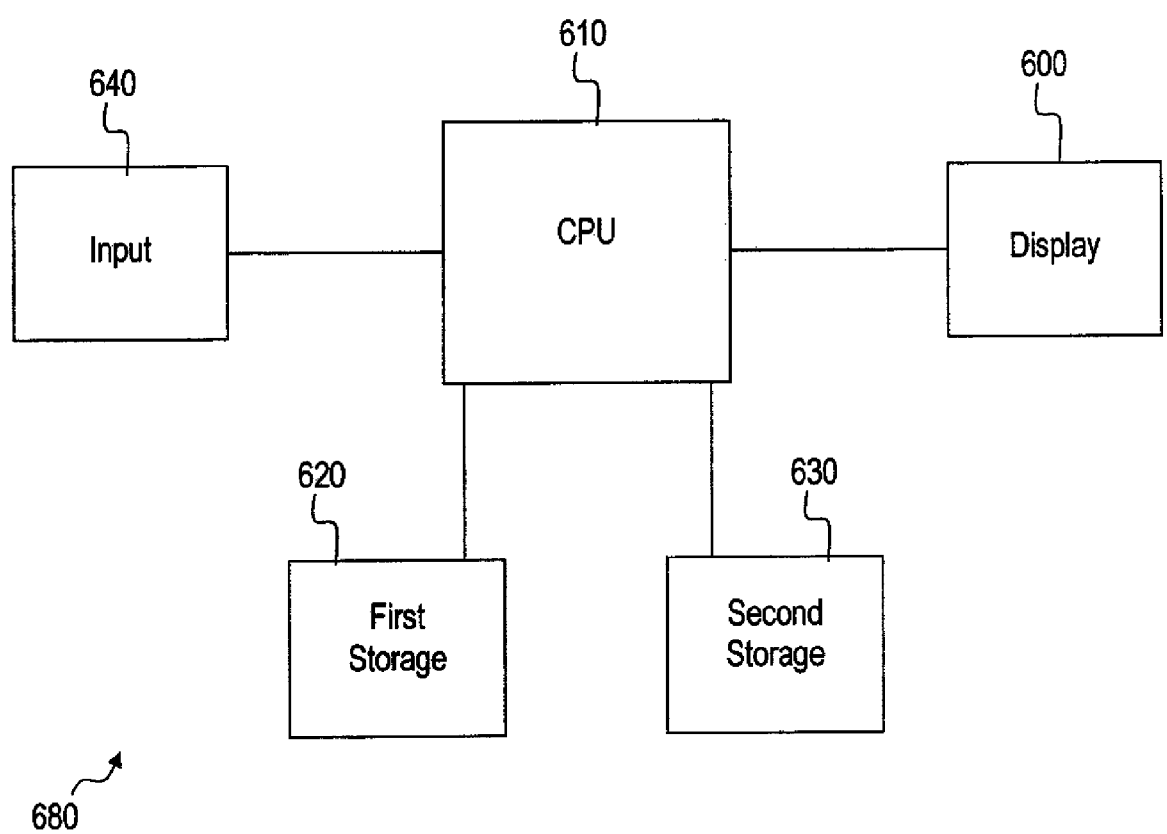
FIG. 6 illustrates an exemplary mobile handset system suitable for implementing the several handsets of the disclosure.

The handsets described above may be implemented on any hand-held mobile electronic device 680 such as is well known to those skilled in the art. An exemplary mobile handset system 680 for implementing one or more embodiments disclosed herein is illustrated in FIG. 6. The mobile handset 680 includes a processor 610 (which may be referred to as a central processor unit or CPU) that is coupled to a first storage area 620, a second storage area 630, an input device 640 such as a keypad, and an output device such as a display screen 600.

The processor 610 may be implemented as one or more CPU chips and may execute instructions, codes, computer programs, or scripts that it accesses from the first storage area 620 or the second storage area 630. The first storage area 620 might be a non-volatile memory such as flash memory. A container and other mobile handset 680 data would typically be installed in the first storage area 620. The second storage area 630 might be firmware or a similar type of memory. A runtime engine and the handset's operating system would typically be installed in the second storage area 630.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented. Further, some or all of the various embodiments described above may be combined or integrated into a single system.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A mobile service oriented architecture for development and deployment of applications and services, comprising:
    a plurality of services;

an interoperability interface to promote communication with each service, the interoperability interface identifying functions provided by each service and defining communication aspects of each service;

an enterprise service bus configured to manage messaging for communicating with the services;

a plurality of applications in communication with the enterprise service bus, each application using one or more of the services;

a plurality of servlets, each servlet in communication with one of the plurality of applications, and each servlet configured to establish one or more instances of the one of the plurality of applications based on parameters; and a handset including a Binary Runtime Environment for Wireless (BREW) actor configured to establish a connection with the plurality of servlets, wherein there is a one-to-many relationship between the BREW actor and the plurality of servlets.

2. The mobile service oriented architecture of claim 1, wherein the BREW actor is further configured to supply at least one parameter to the one of the plurality of applications.

3. The mobile service oriented architecture of claim 1, wherein the handset is a BREW handset.

4. The mobile service oriented architecture of claim 1, further comprising:

a set top box including an adaptor configured to establish a connection with the plurality of servlets and supply at least one parameter to one of the plurality of applications.

5. The mobile service oriented architecture of claim 2, wherein the handset further comprises a user interface application configured to generate an event for the BREW actor to implement and pass at least one parameter to the BREW actor.

6. The mobile service oriented architecture of claim 5, wherein the at least one parameter passed by the user interface application indicates which of the plurality of servlets the BREW actor is to establish a connection with.

7. The mobile service oriented architecture of claim 5, wherein the at least one parameter passed by the user interface application includes the at least one parameter supplied by the handset.

8. The mobile service oriented architecture of claim 7, wherein the user interface application is further configured to generate one or more events for one or more additional actors to gather the at least one parameter supplied by the handset prior to generating the event.

9. The mobile service oriented architecture of claim 5, wherein the at least one parameter passed by the user interface application includes an indication for the BREW actor to generate one or more events to one or more additional actors to gather at least one additional parameter.

10. The mobile service oriented architecture of claim 9, wherein the at least one additional parameter includes the at least one parameter supplied by the handset.

11. A method of communicating with a Java-based mobile service oriented architecture using a Binary Runtime Environment for Wireless (BREW) actor on a handset, comprising:

receiving, by the BREW actor, a first request to execute a first application in the mobile service oriented architecture;

establishing, by the BREW actor, a connection with a first servlet;

initiating, by the BREW actor, an instance of the first application via the first servlet;

receiving, by the BREW actor, a second request to execute a second application in the mobile service oriented architecture;

establishing, by the BREW actor, a connection with a second servlet;

initiating, by the BREW actor, an instance of the second application via the second servlet.

12. The method of claim 11, wherein a first user interface application generates the first request and a second user interface application generates the second request.

13. The method of claim 11, wherein the first request is generated in response to manipulating a first graphical user interface object and the second request is generated in response to manipulating a second graphical user interface object.

14. The method of claim 11, further comprising:
displaying a result of the first application; and
displaying a result of the second application.

15. The method of claim 11, wherein the first request includes one or more parameters.

16. The method of claim 14, wherein one of the one or more parameters is an indication of the first servlet.

17. The method of claim 15, wherein the indication is a uniform resource locator.

18. The method of claim 14, further comprising:
supplying at least one parameter to the first servlet.

19. The method of claim 11, further comprising:
receiving a request for one or more parameters from the first servlet.

20. The method of claim 11, further comprising:
generating an event to collect one or more parameters.

* * * * *